United States Patent [11] 3,633,577

| [72] | Inventor | Sanzio Pio Vincenzo Piatti<br>14 Corso Porta Nuova, Milan, Italy |
|------|----------|---|
| [21] | Appl. No. | 17,075 |
| [22] | Filed | Mar. 6, 1970 |
| [45] | Patented | Jan. 11, 1972 |
| [32] | Priority | Mar. 10, 1969 |
| [33] | | Italy |
| [31] | | 13902 A/69 |

[54] INTERNAL-COMBUSTION ENGINES
6 Claims, 10 Drawing Figs.

| [52] | U.S. Cl. | 123/191 R |
|------|----------|-----------|
| [51] | Int. Cl. | F02b 23/00 |
| [50] | Field of Search | 123/191 R, 90.22, 90.4 |

[56] References Cited
UNITED STATES PATENTS

| 1,459,630 | 6/1923 | Lanzerotti-Spina | 123/90.22 |
| 1,471,408 | 10/1923 | Mertz | 123/191 |
| 1,589,578 | 6/1926 | Vest | 123/191 |
| 3,334,618 | 8/1967 | Funiciello | 123/191 |
| 3,424,143 | 1/1969 | Apfelbeck | 123/191 |

FOREIGN PATENTS

| 166,640 | 1/1956 | Australia | 123/191 |
| 605,789 | 11/1934 | Germany | 123/191 |
| 514,298 | 2/1955 | Italy | |

*Primary Examiner*—Wendell E. Burns
*Attorney*—Holcombe, Wetherill & Brisebois

ABSTRACT: This invention relates to a four-valve combustion chamber for an internal-combustion engine, to a cylinder head and internal-combustion engine incorporating the same, and to a method of forming the same. The combustion chamber comprises a pair of elongated cavities disposed side by side with their longer axes parallel and with a ridge therebetween. The cavity, at least at each end zone thereof, is of part-spherical configuration, and each end zone is formed with an opening therein provided with a valve seat, the axis of which is normal to the part-spherical surface.

INTERNAL-COMBUSTION ENGINES

The present invention relates to combustion chambers of internal-combustion engines into which poppet valves are fitted to allow introduction and exhaust of the gases taking part in the working cycle.

More particularly the invention relates to combustion chambers fitted with four poppet valves, whose seats are on the chamber surface.

Poppet valves for internal-combustion engines have a circular seat and this is usually inscribed on a spherical or plane surface, which are the only simple surfaces on which a circumference can lie. In the case of cylinder heads embodying one or more combustion chambers fitted with four valves both types of surface have been used.

When the inner surface of the cylinder head which defines the chamber is spherical, a radial valve layout is employed, i.e. the four valve axes meet in the center of the spherical surface. This layout is little used, mainly because it complicates the inlet and exhaust manifolds fitted to the cylinder head, the layout of the valve actuating mechanism, and the machining of the actual cylinder head. In effect, while the machining of the combustion chamber inner surface is easy and can be done in one operation with the use of a single spherical cutter, the seats themselves, and the ports leading to them, require machining operations along four different axes.

Another more usual arrangement is the one in which the four valves are divided in two groups, each one of which has two adjacent seats on a flat surface. This is called the pent roof arrangement, as the two flat surfaces make an angle between them in the manner of a roof, the apex line of which is disposed perpendicular to the axis of the engine cylinder. The two valves in the same group usually fulfil the same function, i.e., they belong both respectively to the inlet system or to the exhaust system. As these two valves are parallel, so are their seats and valve guides, and this simplifies machining. Unfortunately, the machining of the combustion chamber inner surface requires a number of different operations and the use of several tools.

From one aspect, the invention consists in a four-valve combustion chamber for an internal combustion engine, which is formed with two elongated cavities disposed side-by-side with their longer axes parallel and with a ridge between the cavities, the cross section of each cavity being substantially arcuate in the direction of its shorter axis and arcuate at least at each end zone in the direction of its longer axis, and an opening in each said end zone which constitutes, or is fitted with, a valve seat.

From another aspect, the invention consists in an internal-combustion engine, having a plurality of in-line cylinders, the cylinder head, or each of the cylinder heads of which, is provided with two inlet and two exhaust valves for each cylinder, wherein each of the plural combustion chambers in the or each cylinder head is formed with two elongated cavities disposed side-by-side with a ridge therebetween, the longer axis of each of said cavities extending transversely to the axis of rotation of the engine crank shaft, the cross section of each cavity being substantially arcuate in the direction of its shorter axis, and arcuate at least at each end zone in the direction of its longer axis, with the centers of the arcs of corresponding end zones of the cavities lying on a common line parallel to the axis of rotation of the engine, and each cavity having a valve seat in each end zone with valves cooperating therewith.

The invention also consists in a method of forming four-valve combustion chambers in a cylinder head for an internal-combustion engine having a plurality of in-line cylinders, which consists in machining in said head a plurality of pairs of side-by-side elongated cavities with a ridge therebetween, one pair for each cylinder, by means of a plurality of pairs of rotary cutters mounted on a common shaft, adjacent pairs being spaced apart in accordance with the cylinder spacing, each cutter of a pair having a peripheral surface which is substantially arcuate in the direction of the axis of said shaft.

It will be seen that the four valves are divided in two pairs, as in the pent roof layout, and the valves of each pair can have their seats lying on the same plane and their guides parallel.

According to a feature of the invention, the ignition of the gases in the or each combustion chamber is performed by a single plug placed in a substantially central position relatively to the four valves. This possesses the advantage that, since the plug is positioned in the ridge between the two elongated cavities, the ignition point is nearer to the piston than is the case with a comparable conventional pent roof layout. The combustion flame travel is thus reduced, which in turn improves the combustion characteristics.

A second advantage of the combustion chamber according to the invention is that the side surfaces of each elongated cavity and the ridge dividing the two side-by-side cavities act as guides for the inlet or the exhaust gases, thus avoiding the formation of rotational gas movements inside, and coaxial with, the cylinder (phenomenon usually called "swirl") which is considered to be detrimental to cylinder filling at high-rotational engine speeds. At the same time, these guiding side surfaces, and the fact that the cavities are curved in the direction of their longer axes, all contribute to the formation of rotational gas movements about axes substantially perpendicular to the cylinder axis, which is considered to be useful.

A third advantage is that machining of the elongated cavities of one or several aligned combustion chambers can be effected in a single operation, using suitably shaped cutters distributed along a single shaft, the axis of rotation of which is parallel to the engine rotation axis, and which is gradually traversed towards the cylinder head. The cutter may also be moved in the direction transverse to the engine axis to further elongate the cavities.

In order that the invention may be more readily understood, reference will now be made to the accompanying drawings, in which.

Figure 1:
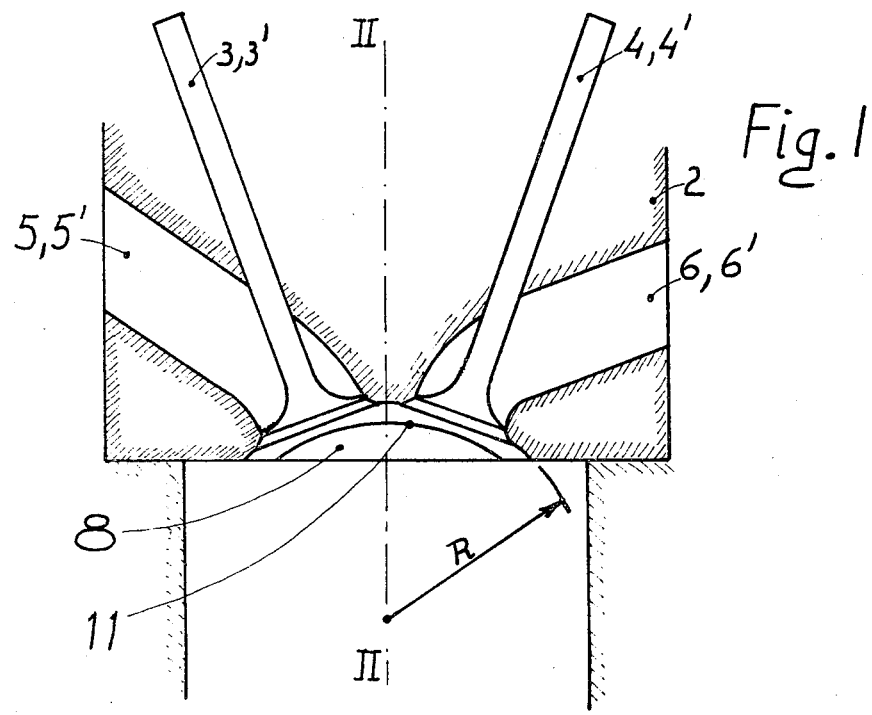
FIG. 1 is a fragmentary section of a cylinder head of an internal-combustion engine according to one embodiment of the invention, taken on line I—I in FIG. 2.
Figure 2:
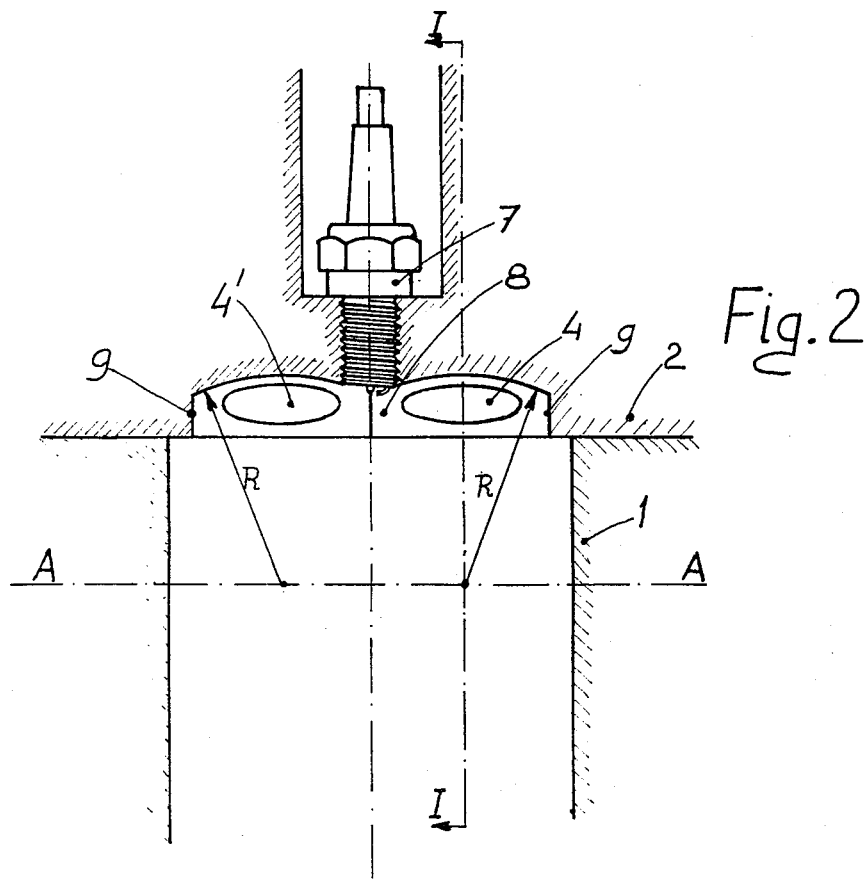
FIG. 2 is a section of the same cylinder head, taken on line II—II in FIG. 1.

Referring to the drawings, the cylinder 1 of an internal-combustion engine is surmounted by a cylinder head 2 into which are fitted valves 3, 3' and 4, 4' respectively controlling the induction ports 5, 5' and exhaust ports 6, 6'. 7 is the plug.

Figure 3:
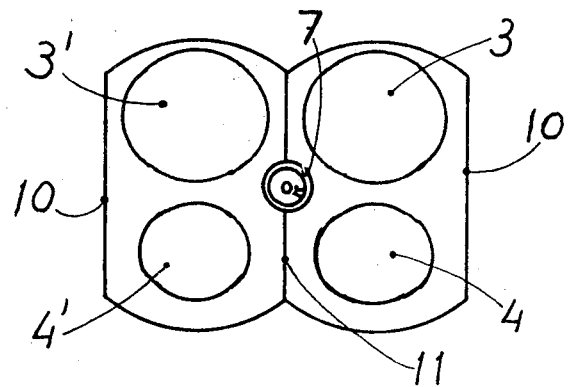
FIG. 3 is an underneath plan view of one combustion chamber of the same cylinder head.
Figure 4:
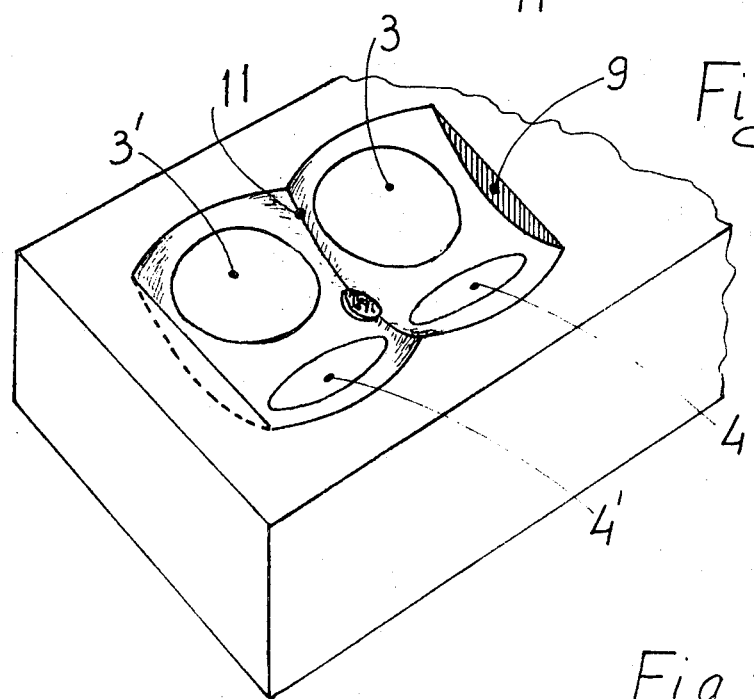
FIG. 4 is a fragmentary perspective view of one cylinder head, in an inverted position, showing a combustion chamber embodying the invention.

Each combustion chamber 8 is formed by two side-by-side elongated part-spherical cavities of radius R, whose centers lie on the axis A—A disposed parallel to the axis of rotation of the engine crankshaft and, in FIGS. 1 to 4, limited sideways by flat surfaces 9 perpendicular to said A—A axis. These side surfaces, when the cylinder head is viewed in plan, as shown in FIG. 3, appear as straight lines 10. The cavities are divided by a ridge 11.

Figure 5:
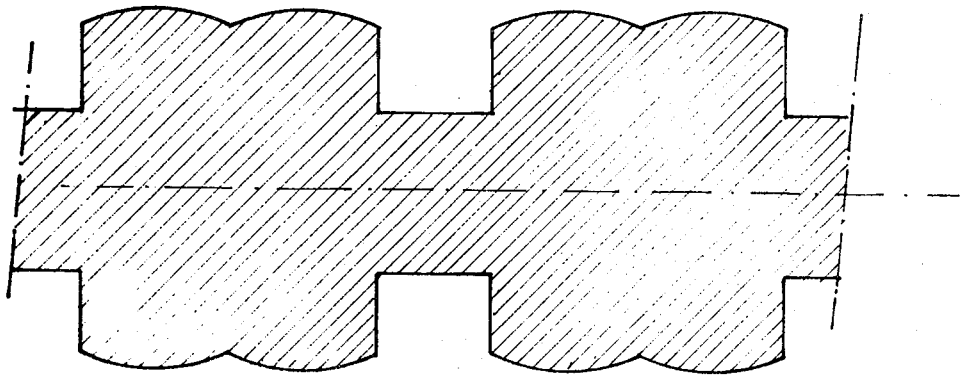
FIG. 5 is a fragmentary side elevation of a cutting tool for machining a plurality of in-line combustion chambers as shown in FIGS. 1 to 4.

The cavities of a number of aligned combustion chambers, are formed simultaneously in the cylinder head by the rotary cutting tool shown in FIG. 5. This tool comprises a plurality of pairs of rotary cutters, one pair for each combustion chamber, mounted on a common shaft rotatable about an axis parallel to the rotational axis of the engine. Each pair of rotary cutters is provided with side-by-side part-spherical peripheral surfaces. In use, the tool is simply traversed towards and away from the underside of the head.

Figure 6:
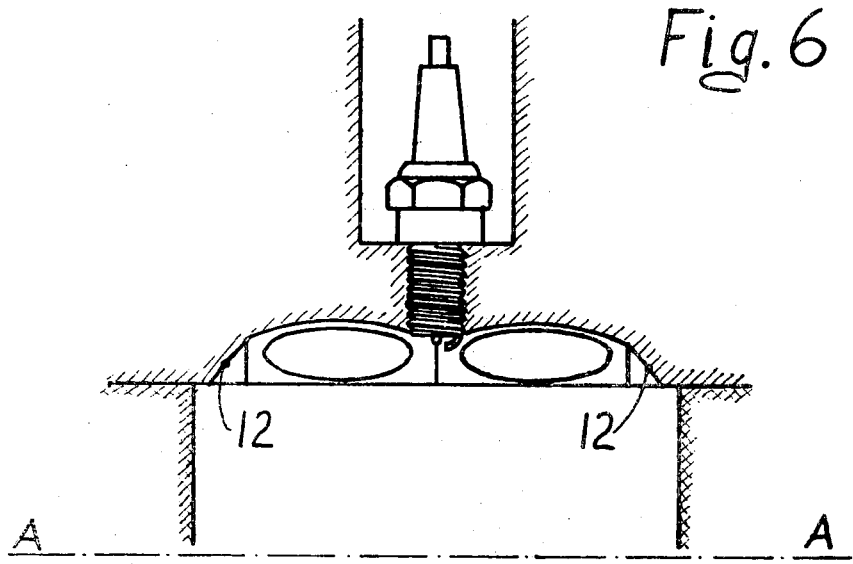
FIG. 6 is a section, similar to FIG. 2, of a cylinder head showing a different embodiment of the invention.
Figure 7:
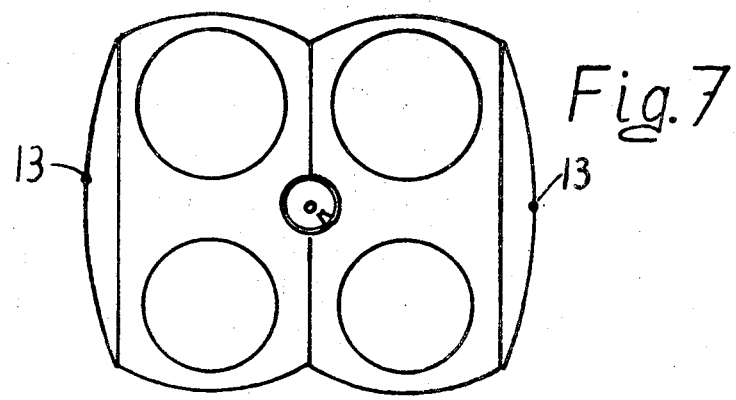
FIG. 7 is an underneath plan view of the embodiment shown in FIG. 6.
Figure 8:
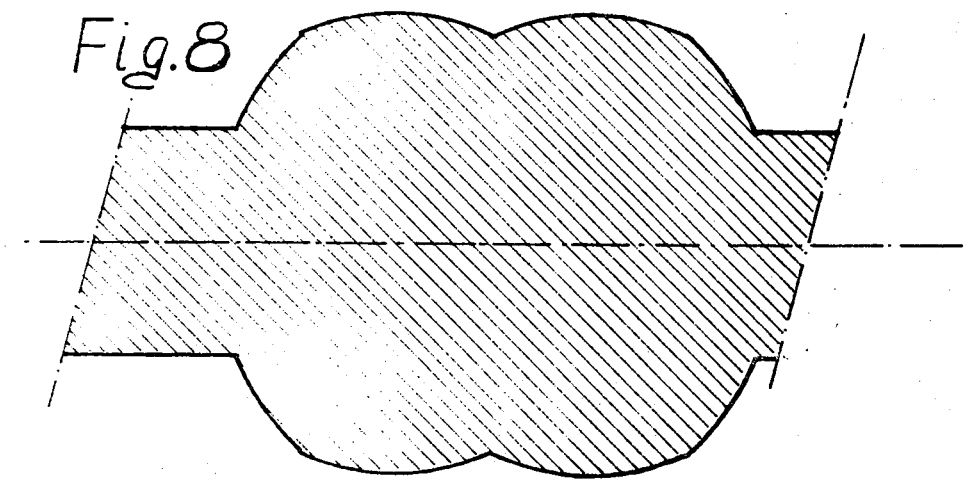
FIG. 8 is a fragmentary side elevation, similar to FIG. 5, of a cutting tool for machining combustion chambers as shown in FIGS. 6 and 7.
Figure 9:
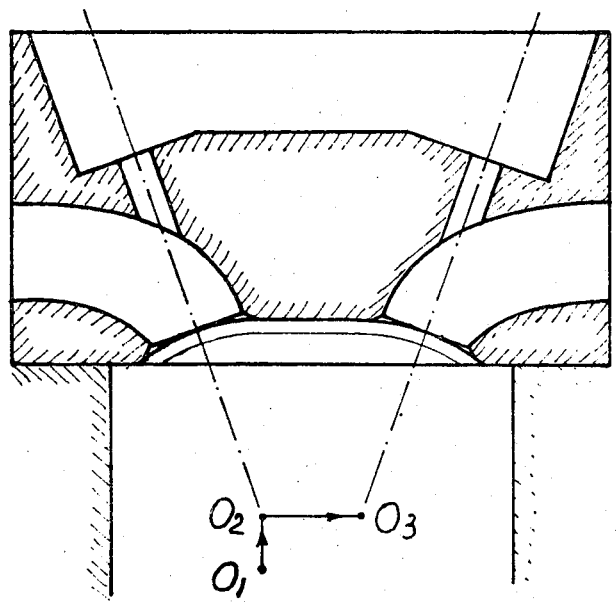
FIGS. 9 and 10 are sections, similar to FIG. 1, of two further embodiments of the invention.
Figure 10:
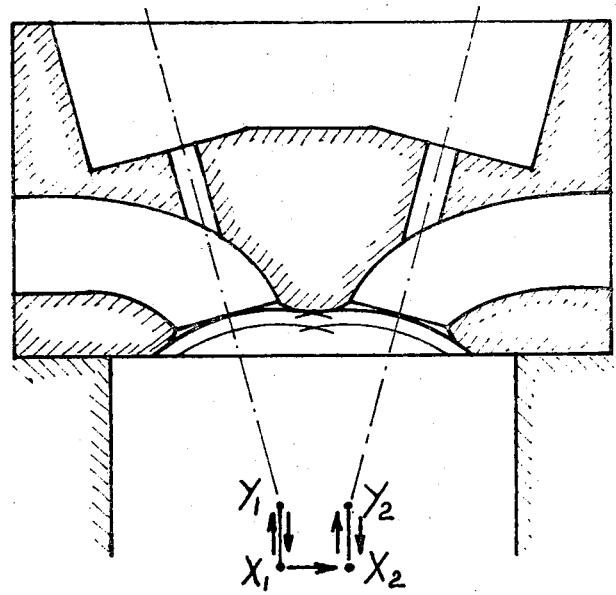

Alternatively as shown in FIGS. 6 and 7, the side surfaces 12 can be engendered by the revolution of a curved line around the axis A—A, by means of the cutting tool shown in FIG. 8. These curved surfaces appear as the curved zones or segments 13 when the cylinder head is viewed in plan, as in FIG. 7. Instead of giving the cavities a single part-spherical curvature in the direction of their longer axes as shown in FIGS. 1 to 4 and 6 and 7, each cavity may be divided into two part-spherical end zones as shown in FIGS. 9 and 10 which are similar to the section shown in FIG. 1. A configuration shown in FIG. 9 is achieved by advancing the axis of the cutter from $0_1$ to $0_2$, and then transversely from $0_2$ to $0_3$. The configuration shown in FIG. 10 is achieved by transversing the cutter from $X_1$ to $Y_1$, withdrawing it, then transversing it from $X_2$ to $Y_2$.

It will be understood that various modifications may be made without departing from the scope of the present invention. For example, the radii of one cavity may differ from that of the other cavity, and, in the FIGS. 9 and 10 embodiments, the radii of the opposite ends of each cavity may be different.

Although, in the embodiments described, the surfaces of the cavities are of part-spherical form, their curvature may be nonspherical, for example, elliptical.

The invention is applicable to multi- and single-cylinder internal-combustion engines.

I claim:

1. A four-valve combustion chamber for an internal-combustion engine, which is formed with two elongated cavities disposed side-by-side with their longer axes parallel and with a ridge between the cavities, the cross section of each cavity being substantially arcuate in the direction of its shorter axis and arcuate at least at each end zone in the direction of its longer axis, and an opening in each said end zone which constitutes, or is fitted with, a valve seat.

2. A combustion chamber as claimed in claim 1, wherein the two cavities are identical, and are each of part-spherical configuration, the axes of the valve seats being normal to said part-spherical surfaces.

3. A combustion chamber as claimed in claim 1, wherein the two end zones of each cavity are of part-spherical configuration with the centers of the part-spheres being spaced apart in the direction of said longer axis.

4. A combustion chamber as claimed in claim 1, wherein a passage adapted to receive a sparking plug opens into the chamber at the apex of the ridge in a substantially central position relative to the valve seats, and wherein the side of each cavity remote from the ridge is formed by a flat side surface extending in the direction of said ridge and longer axis.

5. An internal-combustion engine, having a plurality of in-line cylinders, and at least one cylinder head provided with two inlet and two exhaust valves for each cylinder, wherein each of the plural combustion chambers in said at least one cylinder head is formed with two elongated cavities disposed side-by-side with a ridge therebetween, the longer axis of each of said cavities extending transversely to the axis of rotation of the engine crankshaft, the cross section of each cavity being substantially arcuate in the direction of its shorter axis, and arcuate at least at each end zone in the direction of its longer axis, with the centers of the arcs of corresponding end zones of the cavities lying on a common line parallel to the axis of rotation of the engine, and each cavity having a valve seat in each end zone with valves cooperating therewith.

6. An engine as claimed in claim 5, wherein the cavities are of identical part-spherical configuration, the axes of the valve seats being normal to the part-spherical surfaces, wherein a passage adapted to receive a sparking plug opens into the chamber at the apex of the ridge in a substantially central position relative to the valve seats, and wherein the side of each cavity remote from the ridge is formed by a flat side surface extending in the direction of said ridge and longer axis.

* * * * *